Patented Sept. 19, 1922.

1,429,360

UNITED STATES PATENT OFFICE.

GOLDIE MARTIN, OF WINCHESTER, INDIANA.

INFLAMMABLE COMPOSITION FOR TABLEWARE.

No Drawing.  Application filed August 27, 1921. Serial No. 496,189.

*To all whom it may concern:*

Be it known that I, GOLDIE MARTIN, a citizen of the United States, and a resident of Winchester, in the county of Randolph and State of Indiana, have invented certain new and useful Improvements in Inflammable Composition for Tableware, of which the following is a specification.

This invention relates to improvements in compositions to be utilized in the making of tableware, utensils, vessels, and the like, designed for the retention or serving of foods, or for any article of manufacture ordinarily made of porcelain or china.

The object of the invention is to provide an inflammable composition for making articles such as heretofore mentioned, having somewhat the same appearance and characteristics as china, but comparatively inexpensive in cost, and capable of being completely consumed by burning after a limited period of use. Articles of this character might therefore be classed as semi-permanent; that is to say, capable of withstanding a considerable amount of use without deterioration, but not having the same degree of resistance to breakage as china or other frangible materials.

The field for use of such articles is extensive, including particularly the preparing and serving of food. For such a use, the articles are far more serviceable than paper or wood, yet the cost of replacement is so low that they may be burned after a single using, if the drudgery of dish washing is to be avoided. However, it is contemplated that dishes made of the material might well endure the serving of several meals, or during a much longer period of use with proper care. The serving of food during an outing trip of short duration suggests itself as an example of a use of dishes of semi-permanent character.

Manifestly, the novelty of the invention resides in the composition or material, rather than the articles which may be made therefrom, and with the expressed intention of not limiting the invention in the manner suggested, I will proceed to set forth the ingredients entering into the composition, and their treatment to produce the finished article, whatever it may be.

In general, the material may be said to be composed of ingredients classed broadly as resins and pigments, reduced to a plastic state by the application of heat, and the resulting product shaped into the various articles desired.

Obviously, a material composed of ingredients selected from the general classes of substances mentioned might vary considerably in its composition, depending upon the particular ingredients selected, and their treatment. Therefore, it is my intention to set forth in detail a combination of elements or formula which produces a composition especially suited for the purposes hereinbefore described.

To a mixture of equal parts of white shellac and flake-white is mixed one-twelfth part of a jelly-like substance, consisting of casein dissolved in some acid solvent, such as carbolic acid, the latter substance being prepared prior to the mixing operation by pouring the acid over a quantity of white casein, and allowing it to stand until it becomes a substantially colorless tranparent and jelly-like substance.

The incorporation of the several ingredients is carried on in the presence of heat to a point where the mixture is reduced to a plastic mass of proper consistency; that is, a consistency permitting the same to be kneaded, an operation that is desirable to produce a thoroughly homogeneous mixture, and one of finer texture. In some instances, the addition of a quantity of bluing is desirable to impart the bluish whiteness of china.

In its plastic state, and at a temperature best determined by experiment, the material, after being kneaded, is rolled into sheet form, and thence shaped over forms, or in any other suitable manner, into the articles desired. If desired, also, a quantity of copal or fine white sand may be incorporated, thus increasing the body, and imparting a somewhat coarser texture.

As the articles are allowed to cool, the material becomes hardened or set into permanent shape, forming a hard brittle material not unlike unglazed porcelain in appearance. If desired, the articles may be polished, thereby taking on a lustre equal to that of china. This may be done by applying formaldehyde to the surface of the articles, and rubbing with a cloth or other soft material.

As already suggested, dishes or containers made of the material will retain hot liquids or foods without deterioration. However, it is not the purpose of the invention to provide a substitute for the more permanent substances commonly utilized for making tableware, but rather, as has already been pointed out, an inflammable and inexpensive composition for producing articles for general domestic use, permitting the same to be replaced at a comparatively low cost, and at th same time allowing the maker to carry out and reproduce the artistic designs and decorations found in the more substantial materials.

Having described a preferred method of producing the novel composition, I claim as my invention:

1. An inflammable composition consisting of a mixture of a resinous substance and the resulting product of casein dissolved in carbolic acid.

2. An inflammable composition consisting of a mixture of shellac and flake-white, and substantially ten per cent of the resulting product of casein dissolved in carbolic acid, the whole being reduced to a workable state in the presence of heat.

3. A composition consisting of a mixture of equal parts of shellac and flake-white, and substantially one-twelfth part of a jelly-like substance consisting of casein dissolved in carbolic acid reduced to a plastic state in the presence of heat.

4. An inflammable composition for tableware and like articles consisting of a mixture of white shellac and flake-white, and substantially one-twelfth part of the resulting product of casein and carbolic acid, said mixture being reduced to a plastic mass in the presence of heat.

In witness whereof I hereunto subscribe my name this 24 day of August, A. D. 1921.

Mrs. GOLDIE MARTIN.